(12) United States Patent
Li (10) Patent No.: US 8,850,923 B1
(45) Date of Patent: Oct. 7, 2014

(54) BICYCLE HANDLEBAR ASSEMBLY

(71) Applicant: Mu-Rong Li, Taichung (TW)

(72) Inventor: Mu-Rong Li, Taichung (TW)

(73) Assignee: Blktec Inc., Tortola (VG)

( * ) Notice: Subject to any disclaimer, the term of this patent is extended or adjusted under 35 U.S.C. 154(b) by 0 days.

(21) Appl. No.: 13/914,638

(22) Filed: Jun. 11, 2013

(51) Int. Cl.
 *B62K 21/12* (2006.01)

(52) U.S. Cl.
 CPC .................................. *B62K 21/125* (2013.01)
 USPC ....................................................... 74/551.8

(58) Field of Classification Search
 USPC ................. 74/551.1, 551.3, 551.8; 16/421; 280/288.4
 See application file for complete search history.

(56) References Cited

U.S. PATENT DOCUMENTS

| | | | | |
|---|---|---|---|---|
| 7,837,212 B2* | 11/2010 | D'Aluisio | ................... | 280/281.1 |
| 2003/0150292 A1* | 8/2003 | Duncan | ....................... | 74/551.8 |
| 2005/0109150 A1* | 5/2005 | Chiang et al. | ................ | 74/551.1 |
| 2007/0039409 A1* | 2/2007 | Meng | ........................... | 74/551.8 |
| 2007/0245849 A1* | 10/2007 | Chen | ............................ | 74/551.8 |
| 2012/0001402 A1* | 1/2012 | Weber et al. | ............... | 280/288.4 |

* cited by examiner

*Primary Examiner* — Vicky Johnson (57) ABSTRACT

A bicycle handlebar assembly includes a handlebar, two auxiliary bars, two supporting assemblies and two positioning assemblies. The two auxiliary bars are assembled on the handlebar. Each auxiliary bar has a plurality of first holes and a plurality of second holes corresponding to the first holes. The two supporting assemblies are mounted on the two auxiliary bars respectively. The two positioning assemblies are disposed to the two auxiliary bars and the handlebar. Therefore, each supporting assembly and the respective auxiliary bar are secured on the handlebar via the respective positioning assembly. Furthermore, each supporting assembly and the respective auxiliary bar are adjustable via the first and second holes.

7 Claims, 8 Drawing Sheets

BICYCLE HANDLEBAR ASSEMBLY

BACKGROUND OF THE INVENTION

1. Field of the Invention

The present invention relates to a bicycle handlebar and more particularly to a bicycle handlebar with adjustable auxiliary handlebars.

2. Description of Related Art

Bicycle activity is more and more popular in these days because it is eco-friendly, convenient and entertaining. Many people go shopping or go traveling by bicycles during their leisure time. There are several types of bicycle according to different functions such as road bicycles, mountain bicycles or triathlon bicycles. In particular, triathlon bicycles are a variant of road-racing bicycles, designed primarily to optimize aerodynamics. In order to reduce wind resistance, the most obvious features of a triathlon bicycle is handlebars.

A conventional bicycle handlebar for a triathlon bicycle includes a handlebar and an auxiliary handlebar. The handlebar has two grip portions defined at two sides thereof. The auxiliary handlebar forwardly extends from a central portion of the handlebar. Additionally, two supporting pads are mounted on the auxiliary handlebar. Therefore, a rider could selectively grip the grip portions of the handlebar or the auxiliary handlebar.

However, the conventional bicycle handlebar has a disadvantage as following.

The auxiliary handlebar and the supporting pads cannot be adjusted, so that the conventional handlebar is not satisfied for various riders.

The present invention has arisen to mitigate and/or obviate the disadvantages of the conventional bicycle handlebar.

SUMMARY OF THE INVENTION

The main objective of the present invention is to provide an improved bicycle handlebar with two adjustable auxiliary bars.

To achieve the objective, a bicycle handlebar assembly comprises a handlebar to be mounted on a bicycle stem, two auxiliary bars assembled on a middle portion of the handlebar and spaced by a distance and extending frontward; each of the auxiliary bars defining in a top a plurality of first holes and defining in a bottom a plurality of second holes corresponding to the first holes, two supporting assemblies mounted on the two auxiliary bars respectively via the first holes, two positioning assemblies disposed to the handlebar and the two auxiliary bars, each positioning assembly having an upper gasket, a lower gasket and a plurality of fixing screws, the upper gasket sandwiched between the respective supporting assembly and the respective auxiliary bar, the lower gasket sandwiched between the respective auxiliary bar and the handlebar, each fixing screw passes through the respective supporting assembly, the respective first hole and the respective second hole to the handlebar. Wherein each supporting assembly has a supporting pad, a fixing block and a plurality of adjusting screws; the supporting pad has a plurality of adjusting holes defined therein; adjacent two of the adjusting holes are spaced apart in a distance; the fixing block is sandwiched between the supporting pad and the upper gasket; the fixing screws pass through the fixing block; each adjusting screw passes through one of the adjusting holes and is fixed to the fixing block; the upper gasket has a first arc surface defined at one side thereof and the lower gasket has a second arc surface defined at one side thereof, the first arc surface and the second arc surface respectively corresponding to a top surface and a bottom surface of the respective auxiliary bar; the handlebar has a plurality of assembling holes corresponding to the fixing screws; each positioning assembly has a plurality of nuts corresponding to the fixing screws; each fixing screw passes through the respective assembling hole of the handlebar and is fixed by the respective nut; the handlebar has a first opening and, a channel defined therein; the first opening is to be in communication with an interior of the bicycle stem; the handlebar has a plurality of second opening defined therein; each second opening communicates with the channel of the handlebar; each auxiliary bar has a third opening and a sub channel defined therein; the third opening communicates with the sub channel; the handlebar has a plurality of guiding grooves defined therein; each guiding groove of the handlebar communicates with the channel of the handlebar; a plurality of lids cover the guiding grooves; each lid has a positioning groove defined in one side thereof; the positioning groove of each lid corresponds to the channel of the handlebar and communicates with the respective guiding groove.

Therefore, lengths of the two auxiliary bars and positions of the two supporting assemblies 3 are adjusted so as to be fitted for a rider.

Further benefits and advantages of the present invention will become apparent after a careful reading of the detailed description with appropriate reference to the accompanying drawings.

DETAILED DESCRIPTION OF THE INVENTION

Figure 1:
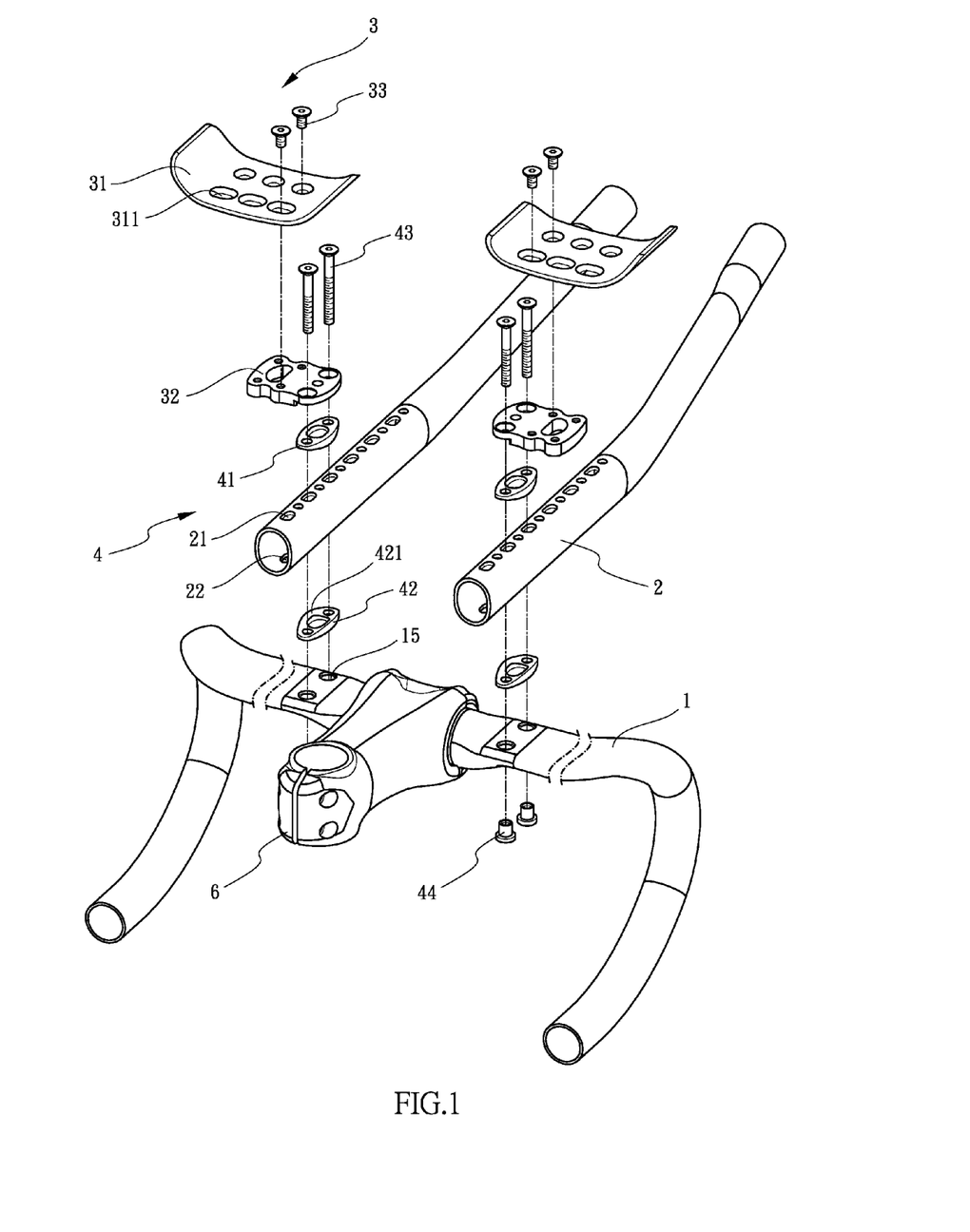
FIG. 1 is an exploded perspective view of a bicycle handlebar assembly in accordance with the present invention.
Figure 2:
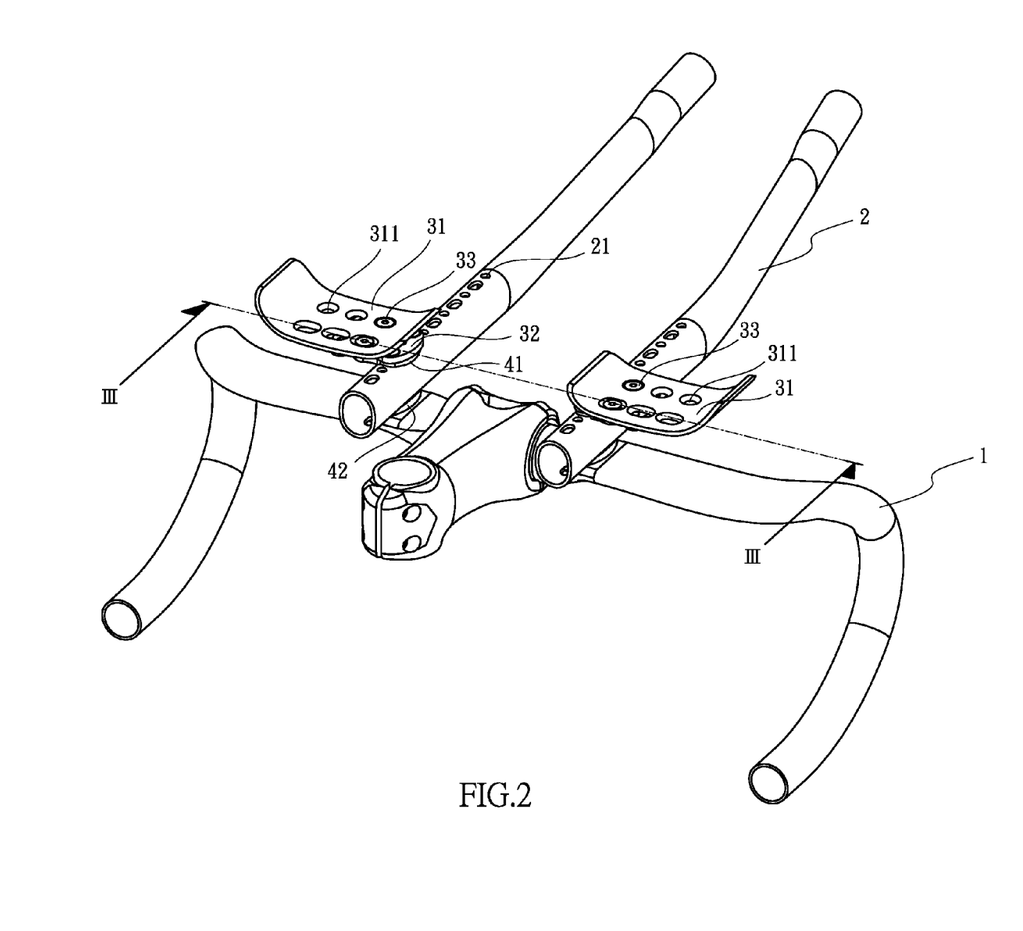
FIG. 2 is a perspective view of the bicycle handlebar assembly of FIG. 1.
Figure 3:
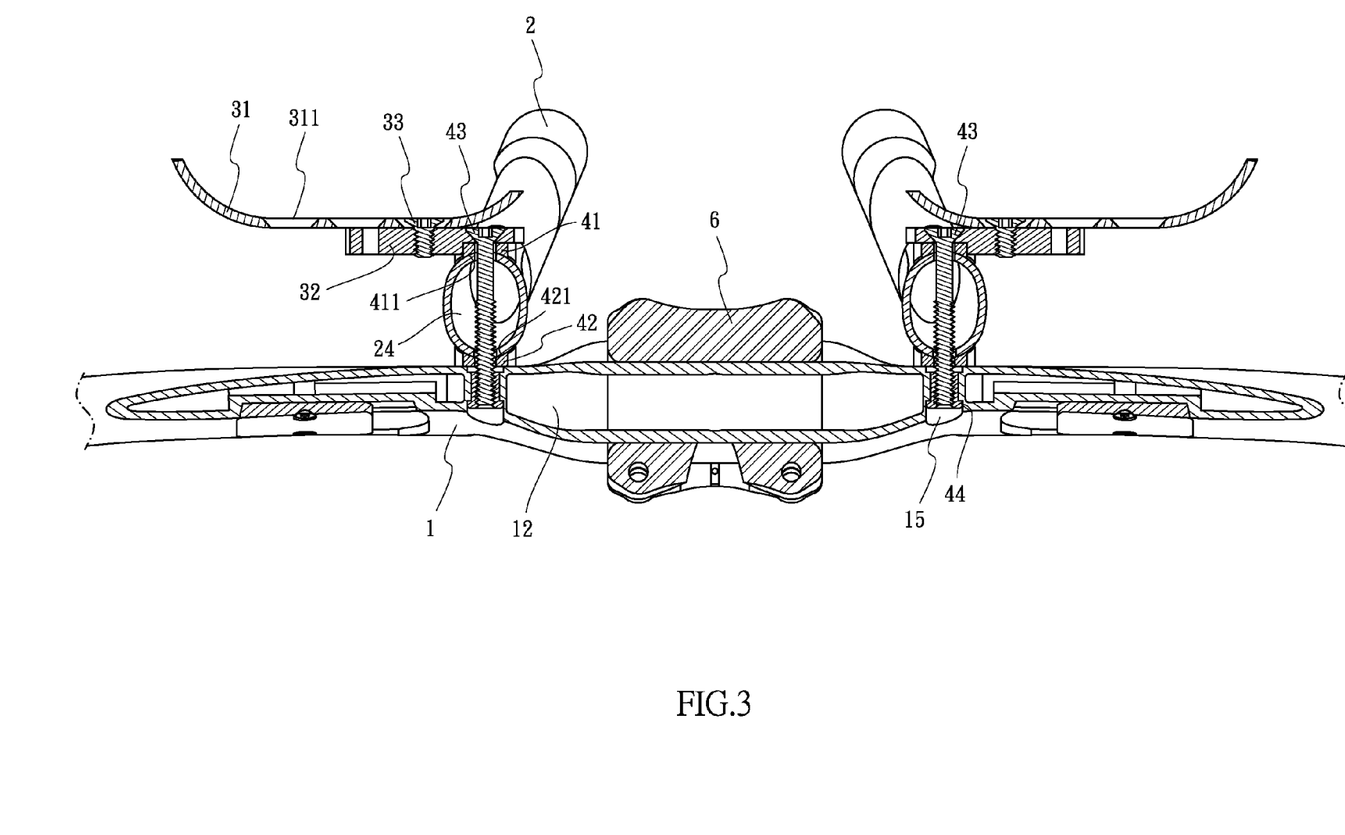
FIG. 3 is a cross-sectional view of the bicycle handlebar assembly along line III-III of FIG. 2.

Referring to FIGS. 1-3, a bicycle handlebar assembly in accordance with the present invention comprises a handlebar 1, two auxiliary bars 2, two supporting assemblies 3 and two positioning assemblies 4. The handlebar 1 is mounted on a bicycle stem 6. The two auxiliary bars 2 are assembled on a middle portion of the handlebar 1. The two auxiliary bars 2 are spaced by a distance and extend frontward. Each auxiliary bar 2 has a plurality of first holes 21 defined in a top thereof and a plurality of second holes 22 defined in a bottom thereof. The second holes 22 correspond to the first holes 21. Therefore, a rider could selectively grip the handlebar 1 or the two auxiliary bars 2.

The two supporting assemblies 3 are mounted on the two auxiliary bars 2 respectively via the first holes 21 for supporting the elbows of the rider, wherein each supporting assembly 3 is adjustable via the first holes 21 of the respective auxiliary bar 2. Two positioning assemblies 4 are disposed to the handlebar 1 and the two auxiliary bars 2. Each positioning assembly 4 has an upper gasket 41, a lower gasket 42 and a plurality of fixing screws 43. The upper gasket 41 is positioned between the respective supporting assembly 3 and the respective auxiliary bar 2. The lower gasket 42 is positioned between the respective auxiliary bar 2 and the handlebar 1. Each fixing screw 43 passes through one of the supporting assemblies 3, one of the first holes 21 and the respective second hole 22 to the handlebar 1.

Figure 4:
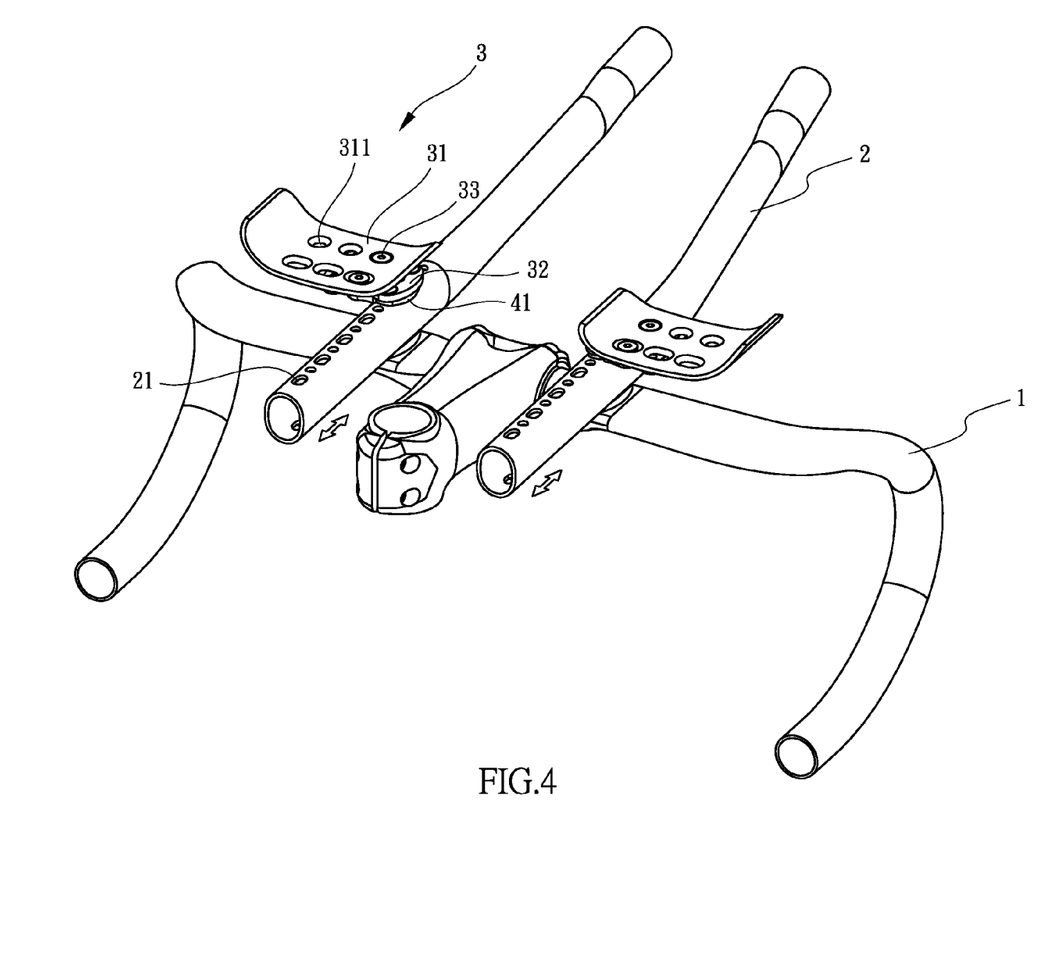
FIG. 4 illustrates that two auxiliary bars of the bicycle handlebar assembly are adjusted relative to a handlebar.
Figure 5:
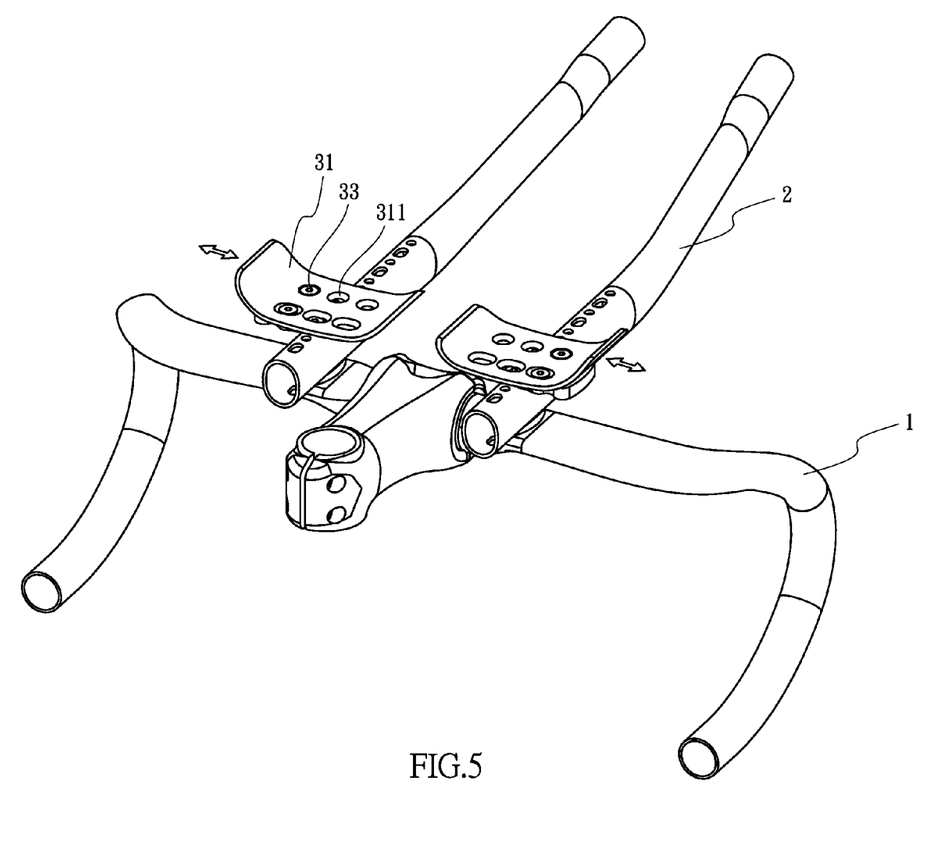
FIG. 5 illustrates that two supporting assemblies of the bicycle handlebar assembly are adjusted relative to the two auxiliary bars.
Figure 8:
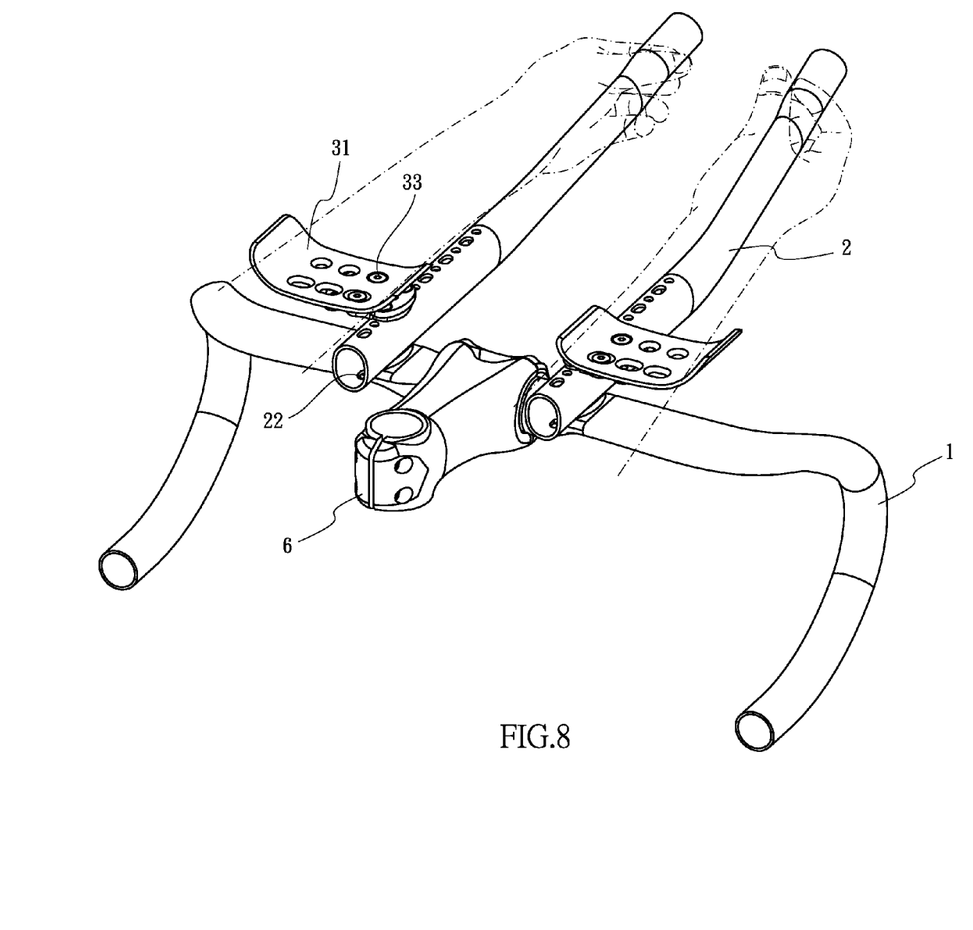
FIG. 8 illustrates a usage condition of the bicycle handlebar assembly.

Referring to FIG. 4 and FIG. 8, each supporting assembly 3 is adjusted relative to the respective auxiliary bar 2. Each auxiliary bar 2 is adjusted relative to the handlebar 1 longitudinally so as to adjust a distance between a terminal end of each auxiliary bar 2 and the handlebar 1. Each fixing screw 43 passes through the respective supporting assembly 3, the upper gasket 41, the respective first hole 21 and the respective second hole 22 of the respective auxiliary bar 2, the lower gasket 42 and is fixed to the handlebar 1; moreover, each supporting assembly 3 could be assembled to different first holes 21 so as to adjust a position of each supporting assembly 3. Each auxiliary bar 2 could be adjusted a length relative to the handlebar 1 via different second holes 22. Therefore, the lengths of the two auxiliary bars 2 and the positions of the two supporting assemblies 3 are adjusted so as to be fitted for the rider.

Furthermore, referring to FIG. 3, the upper gasket 41 is sandwiched between the respective supporting assembly 3 and the respective auxiliary bar 2, and the lower gasket 42 is sandwiched between the respective auxiliary bar 2 and the handlebar 1, so that each auxiliary bar 2 is secured on the handlebar 1.

Referring to FIG. 1, the detail descriptions of the supporting assemblies 3 are shown as following. Each supporting assembly 3 has a supporting pad. 31, a fixing block 32 and a plurality of adjusting screws 33. The supporting pad 31 has a plurality of adjusting holes 311 laterally arranged therein relative to each auxiliary bar 2. Adjacent two of the adjusting holes 311 are spaced apart in a distance. The fixing block 32 is sandwiched between the supporting pad 31 and the upper gasket 41. Each adjusting screw 33 passes through one of the adjusting holes 311 and is fixed to the fixing block 32. The fixing block 32 has a plurality of through holes (not shown) defined therein for positioning the fixing screws 43 and the adjusting screws 33. Each supporting pad 31 is positioned on the fixing block 32 via the adjusting screws 33. Each supporting pad 31 is adjusted relative to the fixing block 32 laterally so as to be fitted for the rider.

Referring to FIG. 3, the upper gasket 41 has a first arc surface 411 defined at one side thereof and the lower gasket 42 has a second arc surface 421 defined at one side thereof. The first arc surface 411 and the second arc surface 421 correspond to a top surface and a bottom surface of the respective auxiliary bar 2 respectively. A curvature of the first arc surface 411 and another curvature of the second arc surface 421 correspond to top and bottom curvatures of each auxiliary bar 2. Another side of the upper gasket 41 is a flat surface which corresponds to the fixing block 32. Another side of the lower gasket 42 corresponds to the handlebar 1 (as shown in FIG. 3, the side of the lower gasket 42 is a flat surface). The supporting pad 31, the fixing block 32, the upper gasket 41, one of the two auxiliary bar 2, the lower gasket 42 and the handle 1 are coupled together via the fixing screws 43 and the adjusting screws 33. Furthermore, the handlebar 1 has a plurality of assembling holes 15 corresponding to the through holes of the fixing block 32. Each positioning assembly 4 has a plurality of nuts 44 corresponding to the fixing screws 43. Each fixing screw 43 passes through the respective assembling hole 15 of the handlebar 1 and is fixed by the respective nut 44, so that the fixing block 32, the upper gasket 41, one of the two auxiliary bar 2 and, the lower gasket 42 are secured on the handlebar 1.

Figure 6:
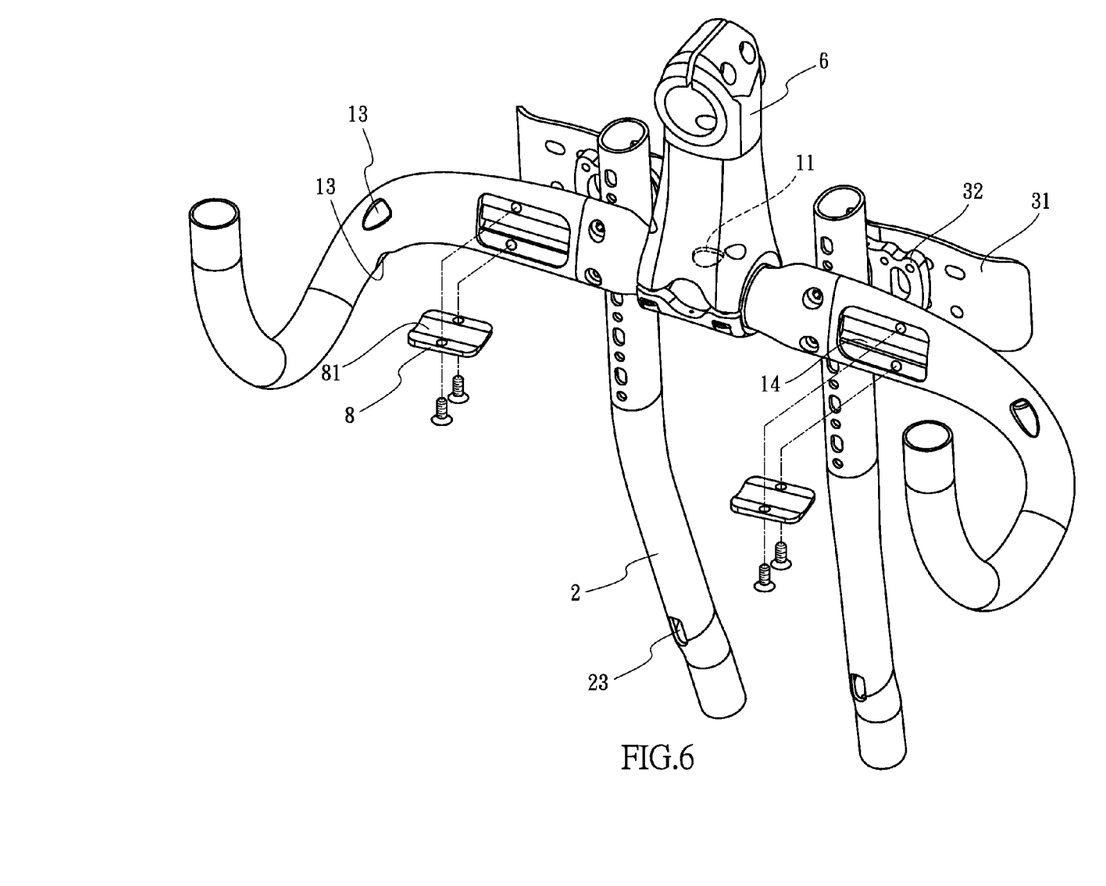
FIG. 6 is a partial exploded perspective view of the bicycle handlebar assembly shown in FIG. 2, taken from another angle.
Figure 7:
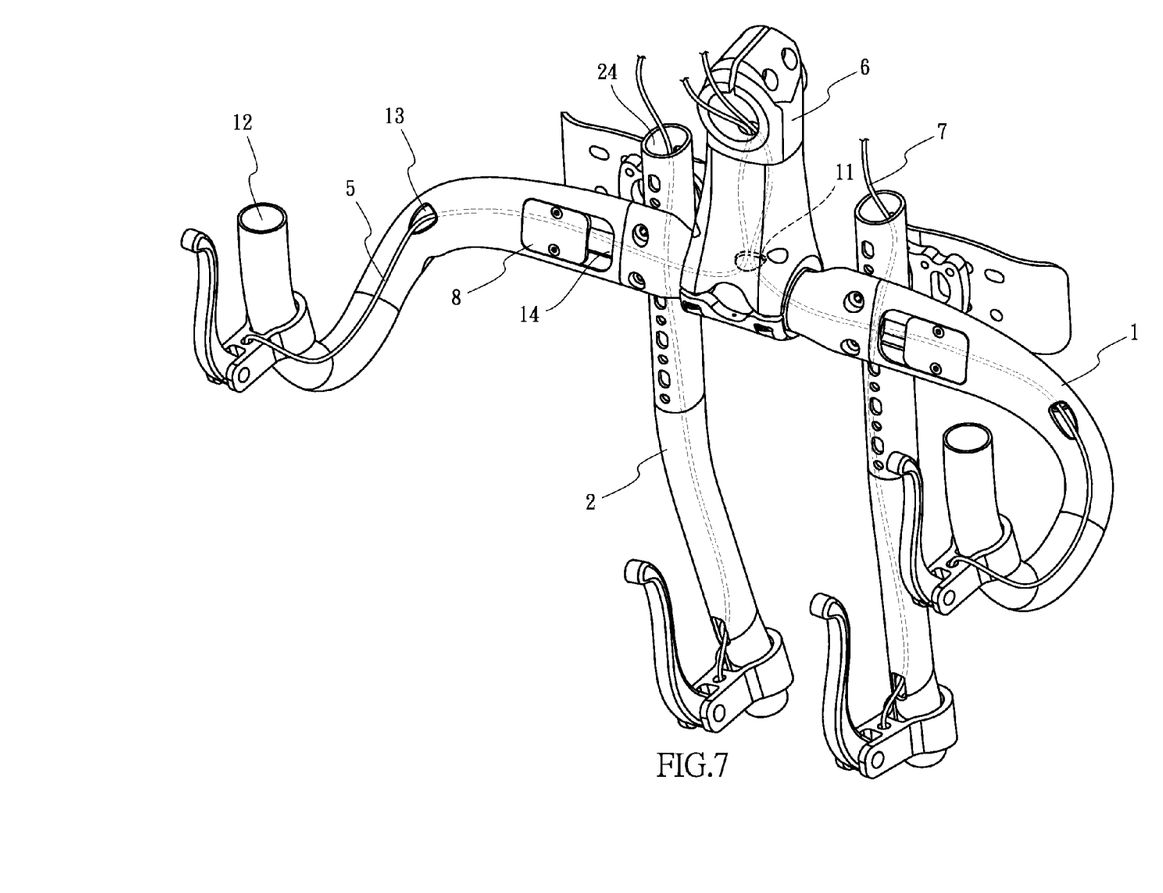
FIG. 7 is a perspective view of the bicycle handlebar assembly, wherein cables and brake levers are disposed to the bicycle handlebar assembly.

Referring to FIGS. 6-7, a braking system (not shown) and a derailleur system (not shown) are generally disposed on the handlebar 1. In order to hide cables 5 (such as brake cable or derailleur cable), the handlebar 1 has a first opening 11 and a channel 12 defined therein. The first opening 11 communicates with an interior of the bicycle stem 6 and the channel 12, so that the cables 5 could pass through the channel 12 to the interior of the bicycle stem 6 via the first opening 11. In addition, the handlebar 1 has a plurality of second openings 13 defined therein. In a preferred embodiment of the present invention, the handlebar 1 has four second openings 13 disposed therein. The four second openings 13 are disposed at two sides of the handlebar 1 respectively. Each second opening 13 communicates with the channel 12. Therefore, the cables 5 at the two sides of the handlebar 1 could pass into the channel 12 via the second openings 13 so as to hide the cables 5.

In addition, a braking system (not shown) and a derailleur system (not shown) are also generally disposed on the terminal ends of the two auxiliary bars 2. In order to hide cables 7 (such as brake cable or derailleur cable), each auxiliary bar 2 has a third opening 23 and a sub channel 24 defined therein. The third opening 23 communicates with the sub channel 24 so that the cables 7 at each auxiliary bar 2 could pass into the sub guiding channel 24 via the third opening 23 so as to hide the cables 7.

Furthermore, the handlebar 1 has a plurality of guiding grooves 14 defined therein. Each guiding groove 14 communicates with the channel 12 of the handlebar 1. A plurality of lids 8 cover the guiding grooves 14. Each lid 8 has a positioning groove 81 defined in one side thereof. The positioning groove 81 corresponds to the channel 12 and communicates with each guiding groove 14. Therefore, the cables 5 are adjusted via the guiding grooves 14 so that the cables 5 could be disposed in the handlebar smoothly and the positioning groove 81 of each lid member 8 could guide the cables 5 in the handlebar 1.

Although the invention has been explained in relation to its preferred embodiment, it is to be understood that many other possible modifications and variations can be made without departing from the scope of the invention as hereinafter claimed.

What is claimed is:

1. A bicycle handlebar assembly, comprising:
   a handlebar to be mounted on a bicycle stem;
   two auxiliary bars assembled on a middle portion of the handlebar and spaced by a distance and extending frontward; each of the auxiliary bars defining in a top a plurality of first holes and defining in a bottom a plurality of second holes corresponding to the first holes;
   two supporting assemblies mounted on the two auxiliary bars respectively via the first holes; and
   two positioning assemblies disposed to the handlebar and the two auxiliary bars, each positioning assembly having an upper gasket, a lower gasket and a plurality of fixing screws, the upper gasket sandwiched between the respective supporting assembly and the respective auxiliary bar, the lower gasket sandwiched between the respective auxiliary bar and the handlebar, each fixing screw passes through the respective supporting assembly, the respective first hole and the respective second hole to the handlebar;

wherein each supporting assembly has a supporting pad, a fixing block and a plurality of adjusting screws; the supporting pad has a plurality of adjusting holes defined therein; adjacent two of the adjusting holes are spaced apart in a distance; the fixing block is sandwiched between the supporting pad and the upper gasket; the fixing screws pass through the fixing block; and each adjusting screw passes through one of the adjusting holes and is fixed to the fixing block.

2. The bicycle handlebar assembly as claimed in claim 1, wherein the upper gasket has a first arc surface defined at one side thereof and the lower gasket has a second arc surface defined at one side thereof, the first arc surface and the second arc surface respectively corresponding to a top surface and a bottom surface of the respective auxiliary bar.

3. The bicycle handlebar assembly as claimed in claim 1, wherein the handlebar has a plurality of assembling holes corresponding to the fixing screws; each positioning assembly has a plurality of nuts corresponding to the fixing screws; each fixing screw passes through the respective assembling hole of the handlebar and is fixed by the respective nut.

4. A bicycle handlebar assembly, comprising:
a handlebar to be mounted on a bicycle stem;
two auxiliary bars assembled on a middle portion of the handlebar and spaced by a distance and extending frontward; each of the auxiliary bars defining in a top a plurality of first holes and defining in a bottom a plurality of second holes corresponding to the first holes;
two supporting assemblies mounted on the two auxiliary bars respectively via the first holes; and
two positioning assemblies disposed to the handlebar and the two auxiliary bars, each positioning assembly having an upper gasket, a lower gasket and a plurality of fixing screws, the upper gasket sandwiched between the respective supporting assembly and the respective auxiliary bar, the lower gasket sandwiched between the respective auxiliary bar and the handlebar, each fixing screw passes through the respective supporting assembly, the respective first hole and the respective second hole to the handlebar;

wherein the handlebar has a first opening and a channel defined therein; and the first opening is to be in communication with an interior of the bicycle stem.

5. The bicycle handlebar assembly as claimed in claim 4, the handlebar has a plurality of second opening defined therein; each second opening communicates with the channel of the handlebar.

6. The bicycle handlebar assembly as claimed in claim 5, wherein each auxiliary bar has a third opening and a sub channel defined therein; the third opening communicates with the sub channel.

7. A bicycle handlebar assembly, comprising:
a handlebar to be mounted on a bicycle stem;
two auxiliary bars assembled on a middle portion of the handlebar and spaced by a distance and extending frontward; each of the auxiliary bars defining in a top a plurality of first holes and defining in a bottom a plurality of second holes corresponding to the first holes;
two supporting assemblies mounted on the two auxiliary bars respectively via the first holes; and
two positioning assemblies disposed to the handlebar and the two auxiliary bars, each positioning assembly having an upper gasket, a lower gasket and a plurality of fixing screws, the upper gasket sandwiched between the respective supporting assembly and the respective auxiliary bar, the lower gasket sandwiched between the respective auxiliary bar and the handlebar, each fixing screw passes through the respective supporting assembly, the respective first hole and the respective second hole to the handlebar;
wherein the handlebar has a plurality of guiding grooves defined therein; each guiding groove of the handlebar communicates with the channel of the handlebar; a plurality of lids cover the guiding grooves; each lid has a positioning groove defined in one side thereof; the positioning groove of each lid corresponds to the channel of the handlebar and communicates with the respective guiding groove.

\* \* \* \* \*